Patented Nov. 28, 1933

1,937,477

UNITED STATES PATENT OFFICE 1,937,477

PROCESS OF PREPARING PARA-HYDROXY-BENZOIC ACID

Lindley E. Mills and William W. Allen, Midland, Mich., assignors to The Dow Chemical Company, Midland, Mich., a corporation of Michigan No Drawing. Application July 5, 1932
Serial No. 620,978

7 Claims. (Cl. 260—110)

The invention relates to improvements in processes of preparing para-hydroxybenzoic acid; and has particular reference to processes wherein the foregoing compound is prepared from ortho-hydroxybenzoic acid (salicyclic acid) as a basic raw material.

The production of di-potassium ortho-hydroxybenzoate in a hydrated form by reacting potassium hydroxide with ortho-hydroxybenzoic acid is known. It has also been disclosed that the hydrated ortho compound rearranges upon heating to about 240° C. to yield di-potassium para-hydroxybenzoate. This dipotassium para-hydroxybenzoate can be then readily acidified to para-hydroxybenzoic acid. However, the yield of para-acid obtained by carrying out this process is approximately only 50 per cent, based on the amount of ortho-acid used, because di-potassium ortho-hydroxybenzoate cannot be completely dehydrated at atmospheric pressure at any temperature below the temperature at which rearrangement to the para-compound begins, and in the presence of even very small quantities of molecularly retained water the rearrangement is accompanied by the production of phenol and potassium carbonate as undesirable by-products.

It is therefore, among the objects of this invention to provide improvements in the foregoing process for the preparation of para-hydroxybenzoic acid whereby, in carrying out the process, the production of phenol and potassium carbonate is substantially avoided and the yield of the para-acid is increased to practically quantitative.

We have now found that the foregoing objects can be accomplished by completely dehydrating the hydrated di-potassium ortho-hydroxybenzoate by heating at a temperature below 240° C. under sub-atmospheric pressure for a suitable period of time, and then heating the anhydrous product in a substantially oxygen-free atmosphere at a temperature of between about 240° and 280° C., followed by acidification of the so-prepared di-potassium para-hydroxybenzoate.

To the accomplishment of the foregoing and related ends, the invention, then, consists of the process hereinafter fully described and particularly pointed out in the claims, the following description setting forth in detail one mode of carrying out the invention, such disclosed mode illustrating, however, but one of various ways in which the principle of the invention may be used.

In carrying out our improved process for the production of para-hydroxybenzoic acid, we prepare di-potassium ortho-hydroxybenzoate in the usual manner by reacting ortho-hydroxybenzoic acid with 2 mols of potassium hydroxide; then heat the di-potassium ortho compound at a temperature between about 130° and 240° C., preferably between about 180° and 230° C. under sub-atmospheric pressure, preferably below about 100 millimeters of mercury absolute, for a sufficient length of time to completely dehydrate the said ortho-compound; then heat the anhydrous product in an atmosphere which contains no free oxygen, e. g. carbon dioxide, nitrogen, etc., at a temperature of between about 240° and 280° C.; and then subsequently acidify the di-potassium para-hydroxybenzoate thus obtained.

The following examples are illustrative of the result which can be obtained by carrying out our invention:—

Example 1

A solution of a di-potassium ortho-hydroxybenzoate was prepared by dissolving 14.2 pounds of 88 per cent potassium hydroxide and 15.6 pounds of ortho-hydroxybenzoic acid in 7.5 pounds of water. This solution was then dried at a temperature of about 190° C. under an absolute pressure of between about 25 and 50 millimeters of mercury, for a period of 3 hours. At the end of this time carbon dioxide was led into the drying vessel under a pressure slightly above atmospheric and the temperature of the anhydrous ortho-hydroxybenzoate was raised to about 240° C., where it was maintained for 3 hours. The product was then cooled, dissolved in 10 pounds of water, and the solution acidified with hydrochloric acid. The acid solution was filtered to obtain the para-hydroxybenzoic acid, which was then dried in the air at about 90° C. The yield of the para-acid was 15 pounds, or above 96 per cent of theoretical based on the 15.6 pounds of ortho-acid used. The melting point of the product, without further purification, was 208°–210° C.

Example 2

The same quantities of reactants as in Example 1 were again intermixed and subjected to a temperature of about 190° C. under an absolute pressure of between about 25 and 50 millimeters of mercury for a period of three hours. At the end of this period the pressure in the reactor was maintained substantially the same but the temperature was raised to about 260° C. and maintained thereat for three hours. The product was then worked up to obtain 14.9 pounds of para-hydroxybenzoic acid, or a yield of 95.5 per cent of theoretical.

It is at once apparent from the foregoing examples that our improvements in processes of preparing para-hydroxybenzoic acid have the effect of practically doubling the yield obtained by former methods, and make possible the direct production of a very high grade product.

It is particularly to be noted that it is not necessary that the hydrated di-potassium ortho-hydroxybenzoate be stirred or agitated during dehydration thereof when such dehydration is accomplished in the manner we have set forth. We have also found it advantageous, in conducting the process in cyclic fashion, to acidify the di-potassium para-hydroxybenzoate with sufficient ortho-hydroxybenzoic acid to replace the potassium substituted in the hydroxyl group prior to acidifying with hydrochloric acid the remaining potassium substituted in the carboxyl group. The potassium chloride and potassium ortho-hydroxybenzoate can then be separated readily. By carrying out this procedure it is apparent that one-half of the potassium is recovered for subsequent use in such form that it does not require further treatment. This procedure cuts in half the amount of potassium chloride which must be electrolyzed to recover the potassium therefrom, and so results in a distinct saving.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention:—

1. In a process for the preparation of para-hydroxybenzoic acid wherein hydrated di-potassium ortho-hydroxybenzoate is an intermediate product, the step which consists in completely dehydrating the said di-potassium ortho-hydroxybenzoate by heating under sub-atmospheric pressure.

2. In a process for the preparation of para-hydroxybenzoic acid wherein hydrated di-potassium ortho-hydroxybenzoate is an intermediate product, the step which consists in completely dehydrating the said di-potassium ortho-hydroxybenzoate by heating to a temperature of between about 130° and 240° C. under an absolute pressure below 100 millimeters of mercury.

3. In a process for the preparation of para-hydroxybenzoic acid wherein hydrated di-potassium ortho-hydroxybenzoate is an intermediate product, the step which consists in completely dehydrating the said di-potassium ortho-hydroxybenzoate by heating to a temperature of between about 180° and 230° C. under an absolute pressure of between about 25 and 50 millimeters of mercury.

4. The process for the preparation of para-hydroxy-benzoic acid which comprises reacting potassium hydroxide with ortho-hydroxybenzoic acid, heating the reaction product under sub-atmospheric pressure whereby it is completely dehydrated, heating the dehydrated product to a temperature of about 240° C. in a substantially oxygen-free atmosphere, acidifying the product whereby para-hydroxybenzoic acid is formed, and separating the said para-acid from the mother liquor.

5. The process for the preparation of para-hydroxy-benzoic acid which comprises reacting potassium hydroxide with ortho-hydroxybenzoic acid, heating the hydrated reaction product to a temperature of between about 130° and 210° C. under an absolute pressure below about 100 millimeters of mercury to dehydrate completely the said hydrated reaction product, heating the dehydrated product to a temperature of about 240° C. in a substantially oxygen-free atmosphere, acidifying the product of the preceding step whereby the said para-acid is obtained, and separating the para-acid from the mother liquor.

6. The process for the preparation of para-hydroxy-benzoic acid which comprises reacting potassium hydroxide with ortho-hydroxybenzoic acid, heating the hydrated reaction product to a temperature of between about 180° and 200° C. under an absolute pressure between about 25 and 50 millimeters of mercury to dehydrate completely the said hydrated reaction product, heating the dehydrated product to a temperature of about 240° C. in a substantially oxygen-free atmosphere, acidifying the product of the preceding step whereby the said para-acid is obtained, and separating the para-acid from the mother liquor.

7. The process for the preparation of para-hydroxy-benzoic acid which comprises reacting potassium hydroxide with ortho-hydroxybenzoic acid, heating the hydrated reaction product to a temperature of between about 180° and 200° C. under an absolute pressure between about 25 and 50 millimeters of mercury to dehydrate completely the said hydrated reaction product, heating the dehydrated product to a temperature between about 240° and 280° C. in a substantially oxygen-free atmosphere, adding ortho-hydroxybenzoic acid to the product of the preceding step whereby about one-half of the potassium therein is replaced with hydrogen and potassium ortho-hydroxybenzoate formed, adding hydrochloric acid to the mixture of the preceding step whereby the remaining potassium is replaced and potassium chloride formed, separating the para-hydroxybenzoic acid from the reaction mixture, separating the potassium ortho-hydroxybenzoate from the potassium chloride mother liquor, and returning the potassium ortho-hydroxybenzoate to the first step of the process.

LINDLEY E. MILLS.
WILLIAM W. ALLEN.